United States Patent
Uchiyama et al.

(10) Patent No.: US 7,639,683 B2
(45) Date of Patent: Dec. 29, 2009

(54) MULTICAST COMMUNICATION METHOD USING LAYER 2 AND 3 SWITCHES

(75) Inventors: Motohiro Uchiyama, Kawasaki (JP); Takahide Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 10/796,223

(22) Filed: Mar. 9, 2004

(65) Prior Publication Data
US 2004/0190514 A1   Sep. 30, 2004

(30) Foreign Application Priority Data
Mar. 27, 2003   (JP) ............................. 2003-088107

(51) Int. Cl.
  H04L 12/56   (2006.01)
  H04L 12/28   (2006.01)
  H04J 3/26    (2006.01)
  H04H 20/71   (2008.01)

(52) U.S. Cl. ..................... 370/390; 370/401; 370/412; 370/432

(58) Field of Classification Search ................. 370/390, 370/467, 408, 432, 312, 349, 254, 401
See application file for complete search history.

(56) References Cited

U.S. PATENT DOCUMENTS

| | | | | |
|---|---|---|---|---|
| 5,517,494 A | * | 5/1996 | Green ........................ | 370/408 |
| 5,926,463 A | * | 7/1999 | Ahearn et al. ................ | 370/254 |
| 6,252,857 B1 | * | 6/2001 | Fendick et al. .............. | 370/254 |
| 6,331,983 B1 | * | 12/2001 | Haggerty et al. ............ | 370/400 |
| 6,370,142 B1 | * | 4/2002 | Pitcher et al. ............... | 370/390 |
| 6,457,059 B1 | | 9/2002 | Kobayashi | |
| 6,532,233 B1 | * | 3/2003 | Matsunaga et al. .......... | 370/390 |
| 6,839,348 B2 | * | 1/2005 | Tang et al. .................. | 370/390 |
| 6,853,639 B1 | | 2/2005 | Watanuki et al. | |
| 6,873,627 B1 | * | 3/2005 | Miller et al. ................ | 370/466 |
| 6,950,439 B1 | * | 9/2005 | Bhagavath et al. .......... | 370/432 |
| 7,012,891 B1 | * | 3/2006 | Chandran et al. ........... | 370/432 |
| 2002/0120769 A1 | * | 8/2002 | Ammitzboell .............. | 709/238 |
| 2003/0123453 A1 | * | 7/2003 | Ooghe et al. ........... | 370/395.53 |

FOREIGN PATENT DOCUMENTS

| | | |
|---|---|---|
| JP | 2000-4251 | 1/2000 |
| JP | 2000-125277 | 4/2000 |
| JP | 2000-134208 | 5/2000 |

OTHER PUBLICATIONS

Internet Engineering Task Force, "RFC 3376: Internet Group Management Protocol, Version 3", Oct. 2002, pp. 1-53.*
Notice of Reasons for Rejection dated Feb. 7, 2008, with translation, from the corresponding Japanese Application.

* cited by examiner

*Primary Examiner*—Steven H Nguyen
*Assistant Examiner*—Adam Duda
(74) *Attorney, Agent, or Firm*—Katten Muchin Rosenman LLP

(57) ABSTRACT

A communication method in a multicast communication network constructed including Layer-2 switches and able to selectively distribute multicast packets to only designated receiving terminals (i.e. receivers), comprising providing a multicast receiving terminal discrimination mechanism for discriminating the multicast receiving terminals and selectively distributing multicast packets to only receiving terminals requesting distribution of multicast packets when there are receiving terminal relating to requests under a Layer-2 switch.

9 Claims, 16 Drawing Sheets

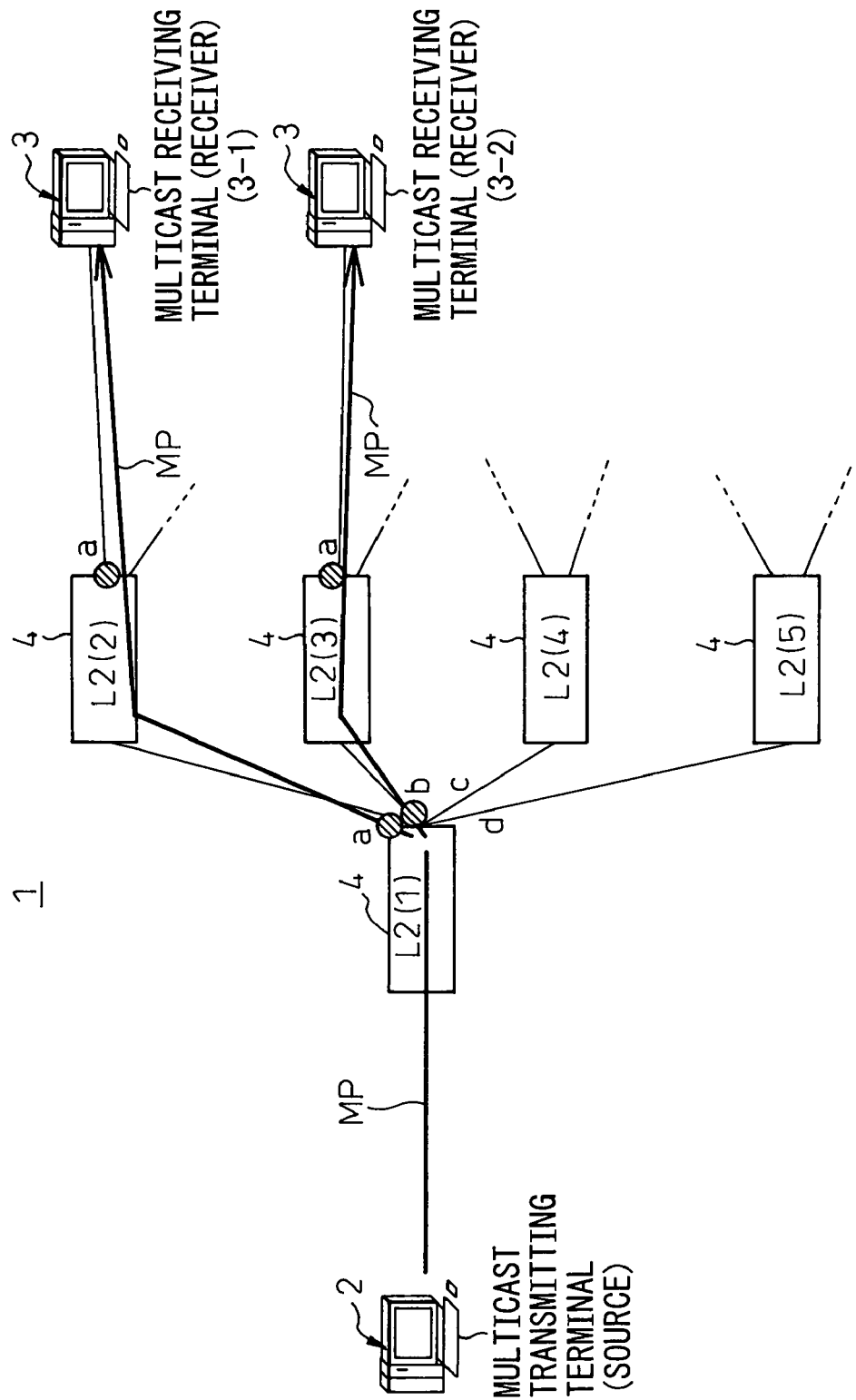

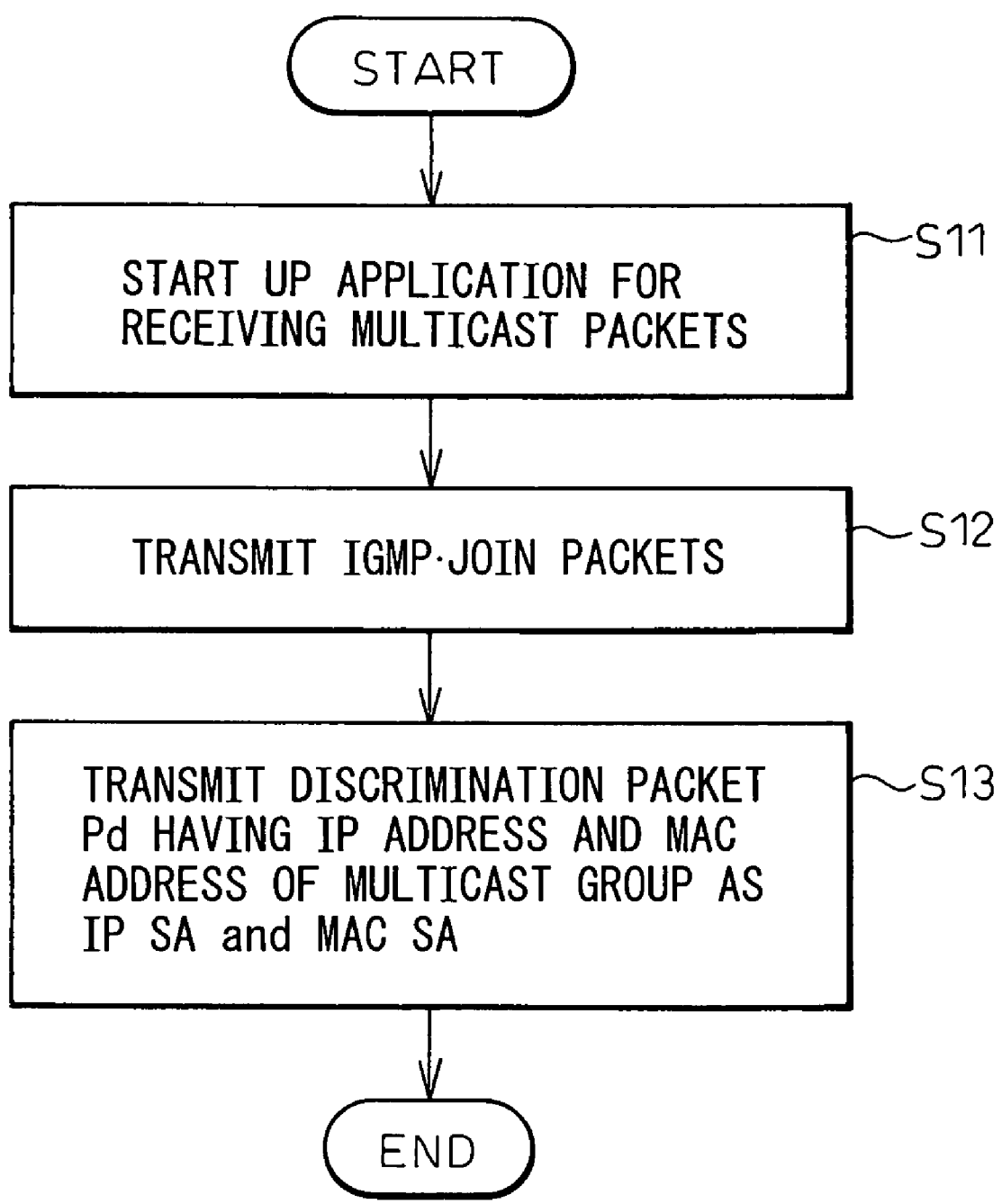

MULTICAST COMMUNICATION METHOD USING LAYER 2 AND 3 SWITCHES

BACKGROUND OF THE INVENTION

1. Field of the Invention

The present invention relates to an Internet protocol (IP) multicast communication network handling for example two-way CATV broadcasts etc., more particularly relates to a multicast communication method, multicast transmitting terminal (i.e. source), multicast receiving terminal (i.e. receiver), Layer-2 (L2) switch, and Layer-3 (L3) switch in such a network.

2. Description of the Related Art

At the present time, there are various types of networks able to handle IP multicast communications. Among these, the present invention particularly concerns an IP multicast communication network including at least layer-2 switches using media access control (MAC) addresses, that is, L2 switches.

In such a network, when a multicast receiving terminal forming part of the network issues a request to the effect of desiring distribution of desired video information, the multicast transmitting terminal which transmits the video information distributes the desired video information in response to the request through the network to that receiving terminal.

In this case, the IP multicast packets used for transferring the video information are relayed on the network through the L2 switches. Since they go through the L2 switches, the packets are transferred without identification of the address. Therefore, the network is flooded.

That is, even a network with no multicast receiving terminal under the L2 switches ends up being sent the IP multicast packets without limit. Therefore, wasted traffic occurs and the network resources are not utilized efficiently.

Note that as known art relating to the present invention, there is Japanese Unexamined Patent Publication (Kokai) No. 2000-125277.

Summarizing the problem to be solved by the invention, the IP multicast communication network disclosed in the above publication is basically equivalent to the network of the related art as explained later referring to FIG. 16. According to FIG. 16, an L2 switch is equipped with an Internet group management protocol (IGMP) SNOOPING function. Further, the multicast receiving terminal (receiver) executes an IGMP JOIN operation for layer-3 switches using an IP address, that is, L3 switches such as routers.

However, even with multicast communication using the above IGMP SNOOPING function, there is the problem that this IGMP SNOOPING function cannot be applied to the following two type I and II IP multicast communication networks, that is, I. A network of a type where the plurality of switches relaying multicast packets between a multicast transmitting terminal (source) and a multicast receiving terminal are all L2 switches and II. A network of a type where the plurality of switches relaying multicast packets between a multicast transmitting terminal and a multicast receiving terminal are L3 switches, but two adjoining L3 switches have at least one L2 switch interposed between them.

SUMMARY OF THE INVENTION

An object of the present invention is to provide a multicast communication method, and an apparatus for the same, in a type I network where multicast packets are distributed through only L2 switches or in a type II network where multicast packets are distributed through a group of switches comprised of L3 switches between each two of which L2 switches are sandwiched, which can selectively distribute multicast packets to only multicast receiving terminals requiring reception of the multicast packets under the L2 switches.

To attain the above object, according to the present invention, there is provided a communication method in a multicast communication network constructed including L2 switches and able to selectively distribute multicast packets to only designated receiving terminals (receivers), comprising providing a multicast receiving terminal discrimination mechanism (10) for discriminating the multicast receiving terminals (3) and selectively distributing multicast packets to only receiving terminals (3) relating to a request when there are receiving terminals (3) requesting distribution of multicast packets under the L2 switches (4).

BRIEF DESCRIPTION OF THE DRAWINGS

These and other objects and features of the present invention will become clearer from the following description of the preferred embodiments given with reference to the attached drawings, wherein:

FIG. 11 is a view of the state of routing of a packet MP after learning at an L2 switch 4;

FIG. 12 is flow chart of an example of operation of a multicast receiving terminal (receiver) 3;

DESCRIPTION OF THE PREFERRED EMBODIMENTS

Preferred embodiments of the present invention will be described in detail below while referring to the attached figures.

The communication method of the present invention basically is a communication method in a multicast communication network (1) for distributing multicast packets (MP) from a multicast transmitting terminal (source) (2) to multicast receiving terminals (receivers) (3) through at least L2 switches (4), comprising forming a receiving terminal discrimination mechanism (10) and distributing multicast packets (MP) selectively by the receiving terminal discrimination mechanism (10) only to multicast receiving terminals (receivers) (3) requesting distribution of multicast packets (MP) when there are multicast receiving terminals (3) relating to such requests under the L2 switches (4).

That is, the method uses the receiving terminal discrimination mechanism to prevent distribution from L2 switches not having multicast receiving terminals requesting distribution under them. This will be illustrated below.

Figure 1:
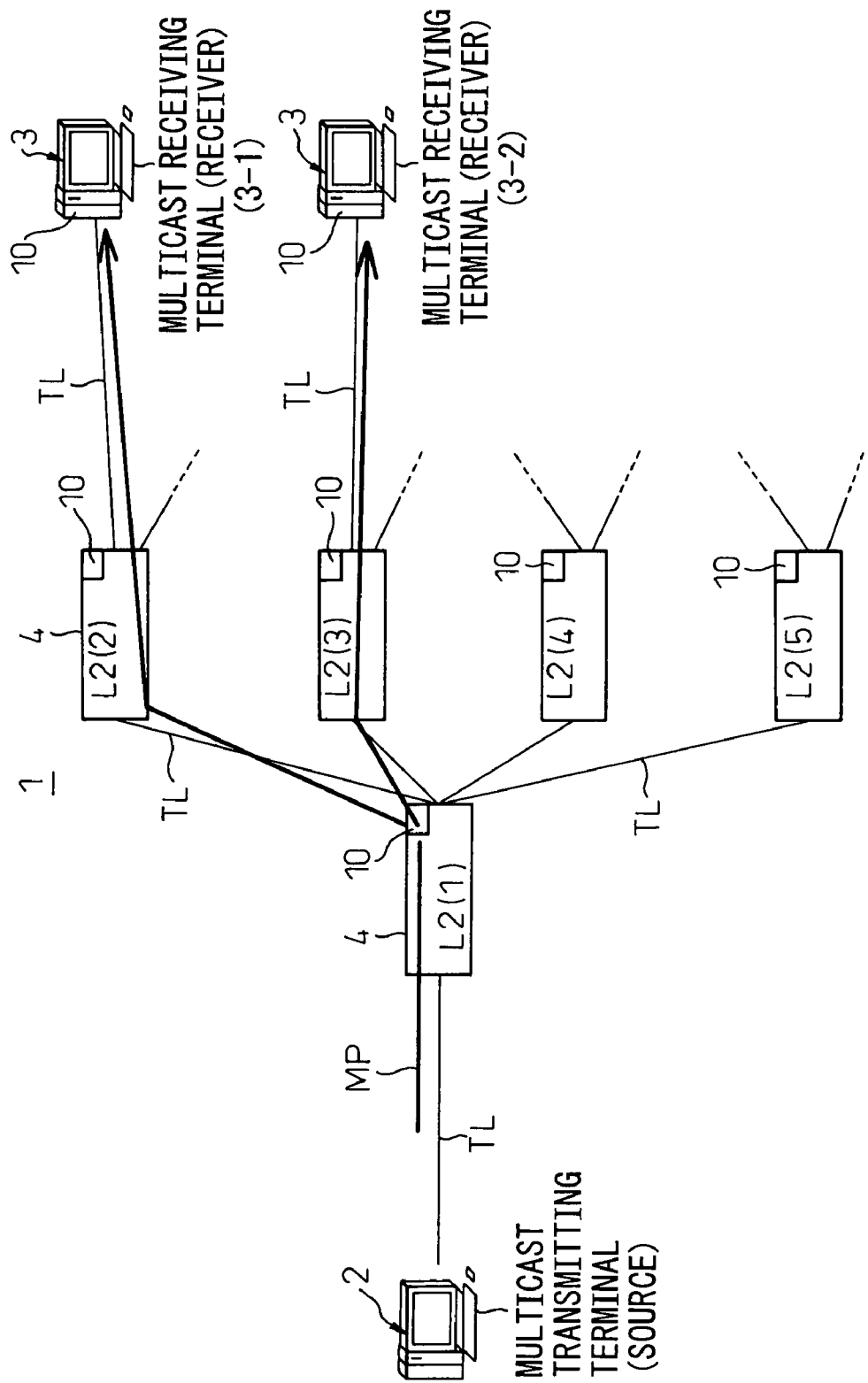
FIG. 1 is a schematic view of a network for explaining a communication method according to the present invention.

FIG. 1 is a schematic view of a network for explaining the communication method according to the present invention.

In the figure, reference numeral 1 indicates an example of a multicast communication network using the communication method of the present invention.

The multicast communication network 1 is formed between a multicast transmitting terminal (source) 2 at the left end of the figure and the multicast receiving terminals 3 at the right end of the figure (in the figure, two terminals 3-1 and 3-2). Relay use L2 switches 4 (in the figure, five switches 4-1 to 4-5) are arranged on transmission lines TL forming parts of the network 1.

When the multicast transmitting terminal 2 transmits multicast packets MP to the multicast receiving terminals 3, the multicast packets MP are distributed from the L2 switch 4-1 to only the L2 switches 4-2 and 4-3. That is, L2 switches not having multicast receiving terminals under them, that is, the L2 switches 4-4 and 4-5, do not receive the multicast packets MP. Such selective distribution is realized by the receiving terminal discrimination mechanism explained above and shown in the figure by reference numeral 10.

The communication method shown in FIG. 1 is distinctive to the present invention. General multicast communication networks up until now did not have such selective distribution distinctive to the present invention. This is shown in the following figure.

Figure 15:
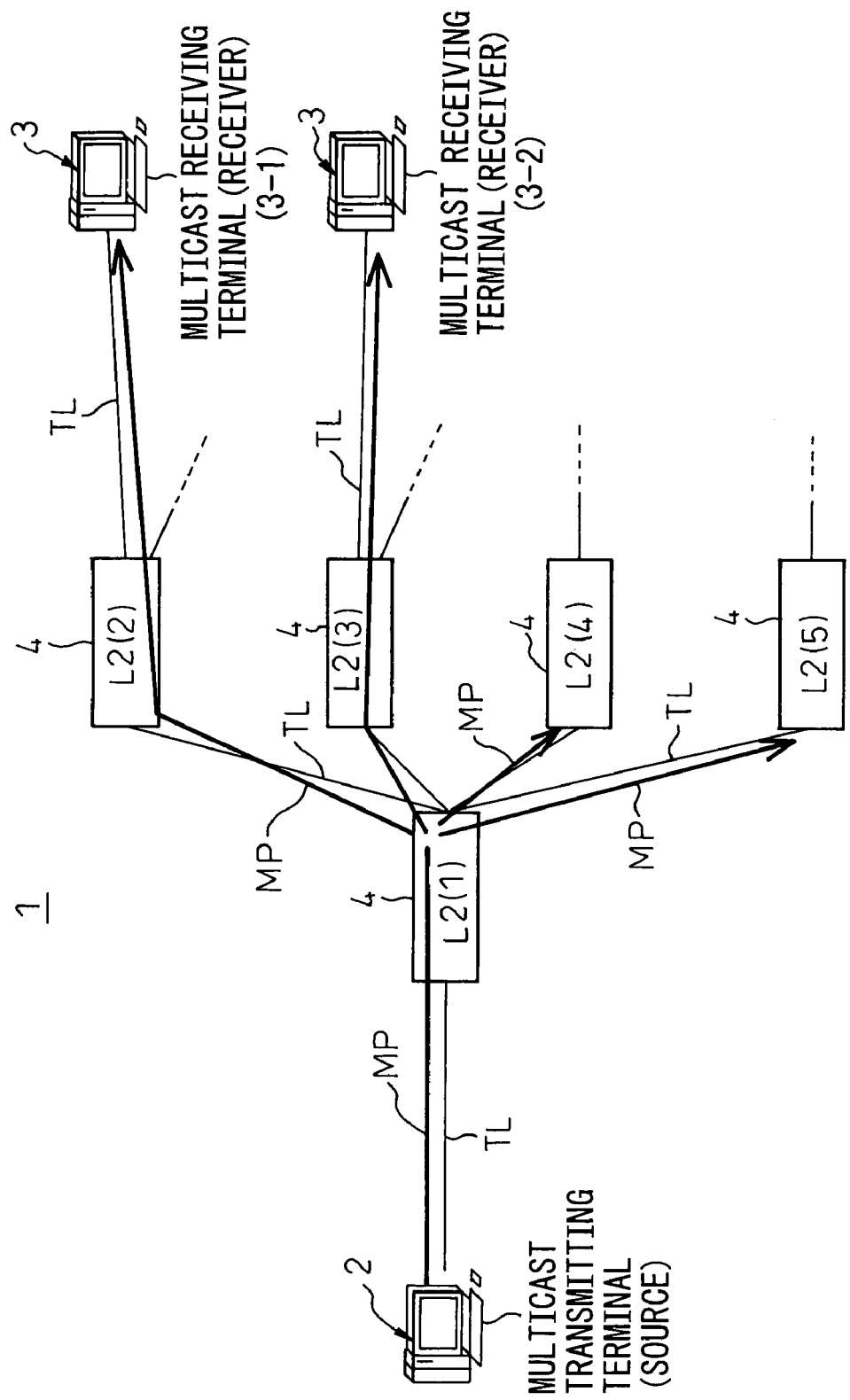
FIG. 15 is schematic view of a network for explaining a general communication method.

FIG. 15 is a schematic view of a network for explaining a general communication method. Note that throughout the drawings, similar components are assigned the same reference numerals or symbols.

The configuration of the network of FIG. 15 is made completely the same as the configuration of the network of FIG. 1 so as to clarify the differences from the present invention.

The point to note in the present invention is that the multicast packets MP flood the parts of the network relayed to by the L2 switches and end up being transmitted to even receiving terminals (receivers) 3 under all L2 switches.

That is, in the figure, the multicast packets MP end up being transmitted even to L2 switches 4-4 and 4-5 not having multicast receiving terminals under them. This results in wasted use of network resources.

In recent years, in the Japanese telecommunication environment, there has been a trend for constructing broadband Ethernets etc. by L2 switches to provide telecommunication services. It is expected that a considerably tremendous amount of data, for example, multicast packets such as streaming data, will be distributed under this telecommunication environment. Therefore, huge amounts of unused wasted packets would flood the networks. In the worst case, the networks may even stop functioning.

When envisioning such a communication environment, the communication method of the present invention shown in FIG. 1 would be extremely useful as one technology for achieving the object of the invention.

Figure 16:
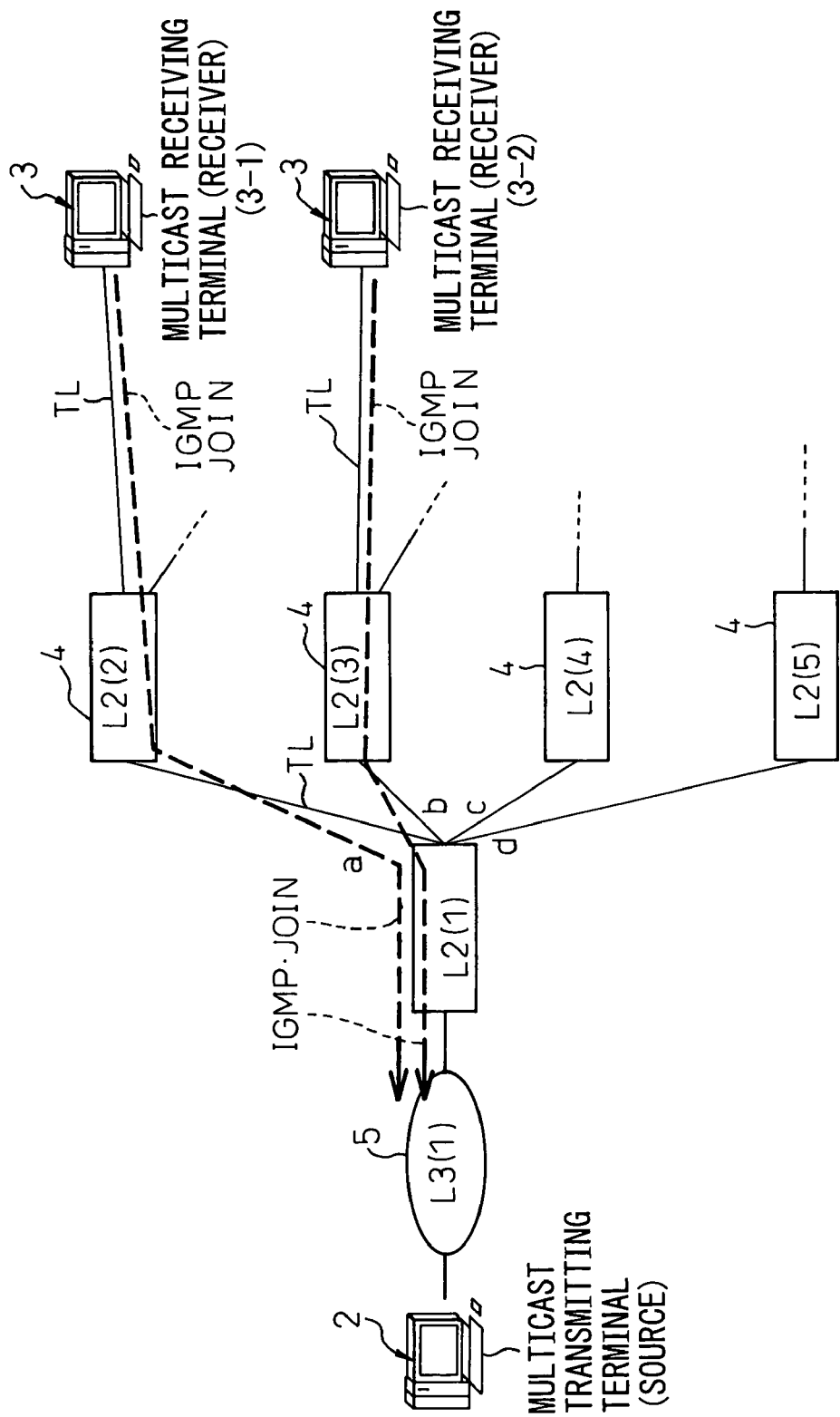
FIG. 16 is a view of a first example of a multicast communication network introducing "IGMP-SNOOPING" technology.

As another technology for achieving the object of the invention, there is the technology shown in FIG. 16.

FIG. 16 is a view of a first example of a multicast communication network in which "IGMP SNOOPING" technology is introduced.

The network of the first example shown in the figure has the configuration of FIG. 1 plus an L3 switch 5 (in the figure, 5-1) such as an IP multicast router. That is, the L3 switch 5-1 and the multicast receiving terminals (receivers) 3-1 and 3-2 have the above-mentioned L2 switches 4-1 to 4-3 inserted between them.

When introducing the above "IGMP SNOOPING" technology, the L2 switches 4-1 to 4-3 and L2 switches 4-4 and 4-5 are equipped with "IGMP SNOOPING" functions. In this way, it is possible to selectively distribute multicast packets MP to only the L2 switches 4-1 and 4-2 to which the multicast receiving terminals 3-1 and 3-2 are connected.

For this, the receiving terminals 3-1 and 3-2 first perform IGMP JOIN operations on the L3 switch 5-1 for selective multicast communication. That is, the receiving terminals 3-1 and 3-2 send "IGMP JOIN" packets.

This being so, the L2 switch 4-1 equipped with the "IGMP SNOOPING" function monitors ("snoops") for passage of "IGMP JOIN" packets. Further, when the passage of "IGMP JOIN" packet has been determined, the ports where they passed through are identified. In the case of the illustrated example, the port "a" and the port "b" among the ports "a" to "d" of the L2 switch 4-1 are identified as the ports of passage of "IGMP JOIN" packets.

When identified, when multicast packets MP are transmitted from the multicast transmitting terminal (source) 2, the L2 switch 4-1 receiving the multicast packets MP distribute the multicast packets MP to only the identified port "a" and port "b". Therefore, the multicast packets MP reach only the multicast receiving terminals 3-1 and 3-2.

On the other hand, the multicast packets MP are not distributed to the port "c" and port "d" of the L2 switch 4-1 where passage of "IGMP JOIN" packets is not determined.

Another network other than the multicast communication network introducing "IGMP SNOOPING" technology shown in FIG. 16 will be shown next.

Figure 17:
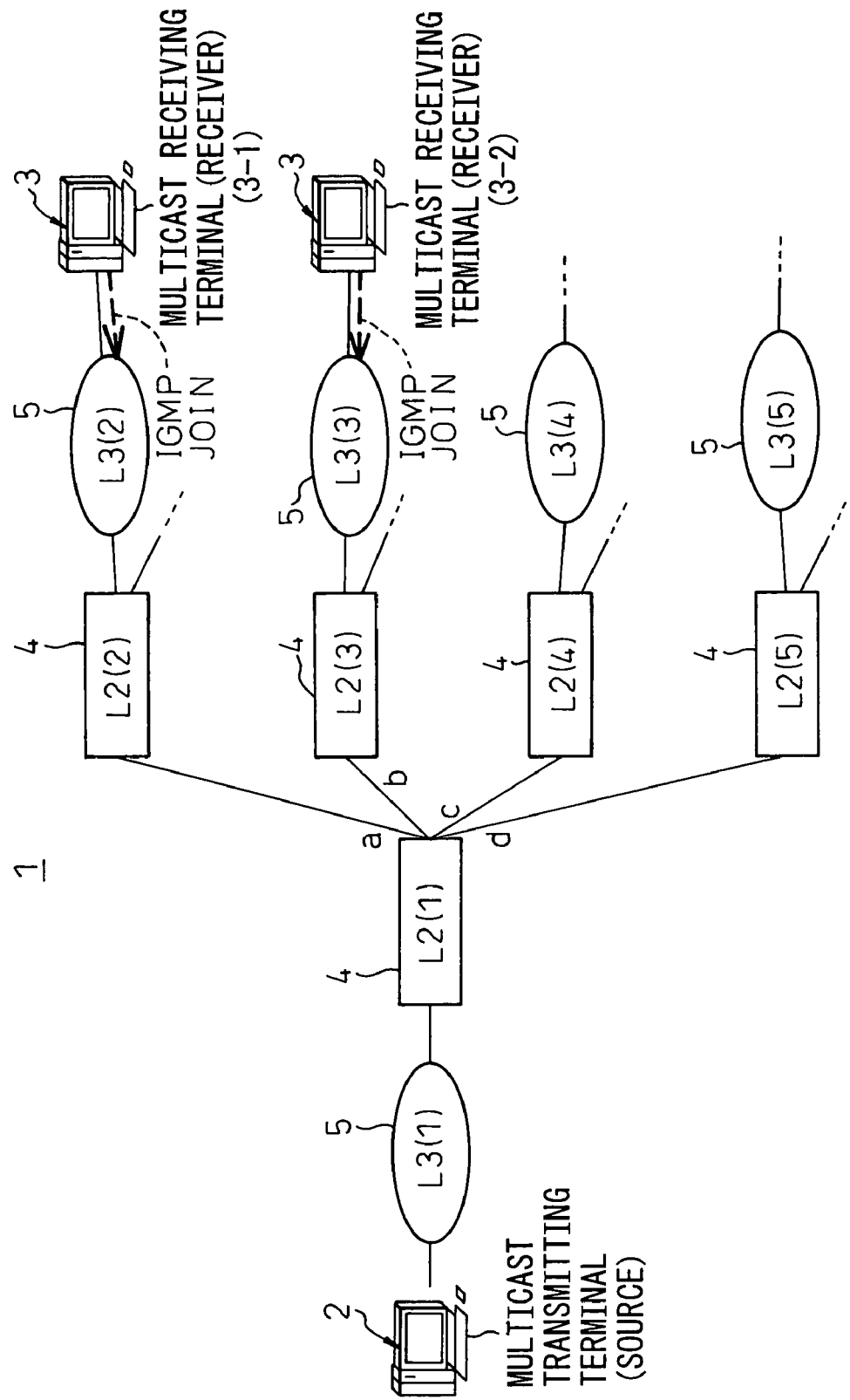
FIG. 17 is a view of a second example of a multicast communication network introducing "IGMP-SNOOPING" technology.

FIG. 17 is a view of a second example of a multicast communication network in which the "IGMP SNOOPING" technology is introduced.

The network of the second example shown in this figure has the configuration shown in FIG. 1 plus L3 switches 5 (in the figure, 5-1 to 5-5) such as IP multicast routers. It differs from FIG. 16 in the point of addition of the L3 switches 5-2 to 5-5.

The point to note in the case of FIG. 17 is that even if "IGMP JOIN" packets are transmitted from the multicast receiving terminals (receivers) 3-1 and 3-2, they only reach the L3 switches 5-2 and 5-3 and do not reach the further upstream L2 switches. Therefore, the "IGMP SNOOPING" functions equipped in these L2 switches do not operate at all.

The point is that while the "IGMP SNOOPING" function sufficiently operates in the network shown in FIG. 16, it does not function at all in the network shown in FIG. 17.

However, even in the network shown in FIG. 16, if the IP multicast router, that is, the L3 switch 5-1, is removed later, that is, when the network is configured as shown in FIGS. 1 and 15, the above-mentioned "IGMP SNOOPING" functions end up not being able to be utilized at all.

This is due to the fact that "'IGMP JOIN' signals are only transferred between the multicast receiving terminal and its nearest multicast router (L3 switch)".

FIG. 1 shows the already explained type I network using the communication method of the present invention, but the communication method according to the present invention can also be applied to the above-mentioned type II network. This is shown in FIG. 2.

Figure 2:
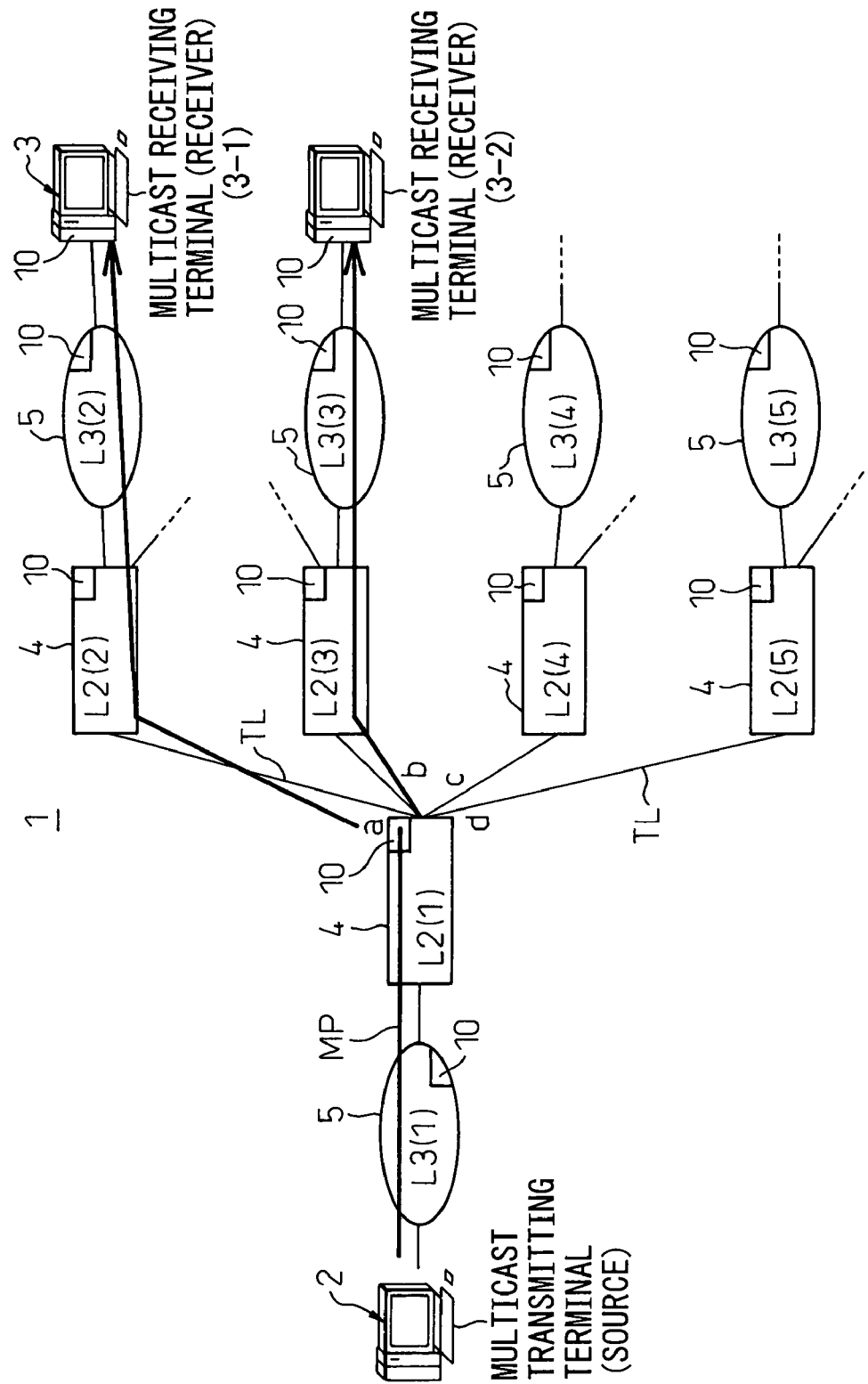
FIG. 2 is another schematic view of a network using a communication method according to the present invention.

FIG. 2 is a schematic view of another network using the communication method according to the present invention. This type II network however is the same as the above-mentioned FIG. 17.

In FIG. 2 as well, like FIG. 1, the multicast packets MP from the multicast transmitting terminal (source) 2 are selectively distributed to only the multicast receiving terminals (receivers) 3-1 and 3-2 requesting reception. The above-explained packet flooding therefore does not occur.

Figure 3:
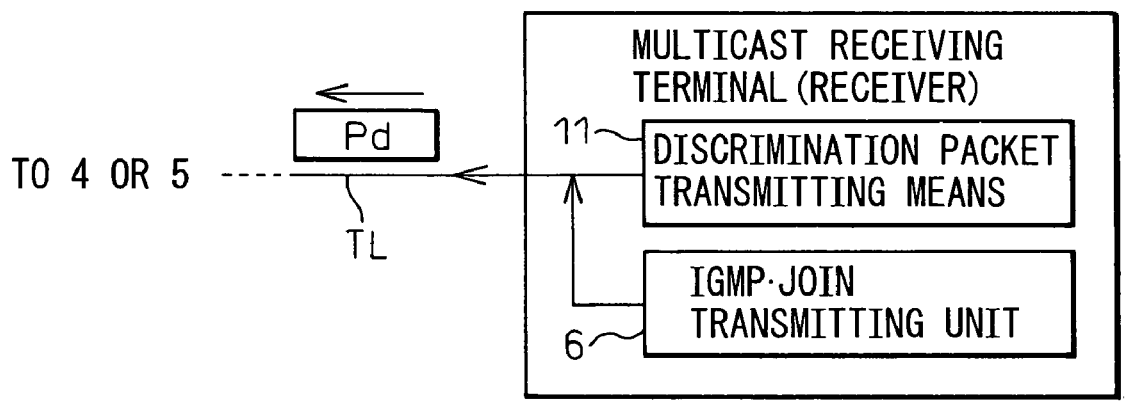
FIG. 3 is a view of the basic configuration of a multicast receiving terminal (receiver) 3 shown in FIGS. 1 and 2.

FIG. 3 is a view of the basic configuration of a multicast receiving terminal 3 shown in FIGS. 1 and 2.

In the figure, the multicast receiving terminal 3 is a receiving terminal receiving multicast packets MP distributed from the multicast transmitting terminal 2 through at least an L2 switch 4 and is provided with a discrimination packet transmitting means 11.

The discrimination packet transmitting means 11 generates a discrimination packet Pd for teaching the L2 switch 4 that there is a multicast receiving terminal requesting distribution of multicast packets MP under it and transmits it to the L2 switch 4 side. The discrimination packet transmitting means 11 forms one part of the receiving terminal discrimination mechanism 10 shown in FIGS. 1 and 2. Note that the discrimination packet Pd can be illustrated as follows.

Figure 4:
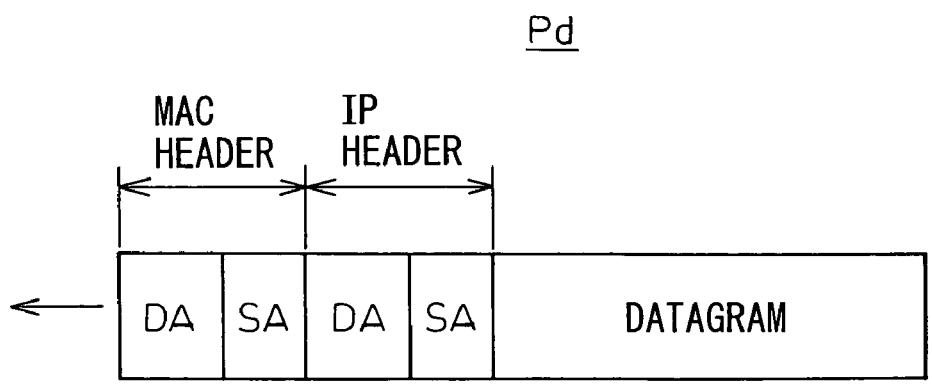
FIG. 4 is a view of the data format of a discrimination packet Pd of FIG. 3.

FIG. 4 is a view of the data format of the discrimination packet Pd of FIG. 3.

As illustrated in the figure, the discrimination packet Pd is comprised of a MAC header, IP header, and datagram. The MAC header is comprised of a destination address DA and source address SA. The IP header is also comprised of a destination address DA and source address SA. After these, as illustrated, the datagram follows as the packet payload.

The discrimination packet Pd according to the present invention includes an IP header and MAC header as explained above, but is characterized in that the IP source address (SA) and MAC source address (SA) are made an IP address and MAC address of the multicast group in which the multicast receiving terminal (receiver) 3 participates. A specific example will be explained later.

Further, the discrimination packet Pd is periodically transmitted by unicast.

Further, in actuality, the discrimination packet Pd is desirably transmitted when transmitting an IGMP JOIN packet explained in FIGS. 16 and 17. Note that this IGMP JOIN packet is transmitted from an existing IGMP JOIN transmitting unit 6.

Next, look at the L2 switch.

Figure 5:
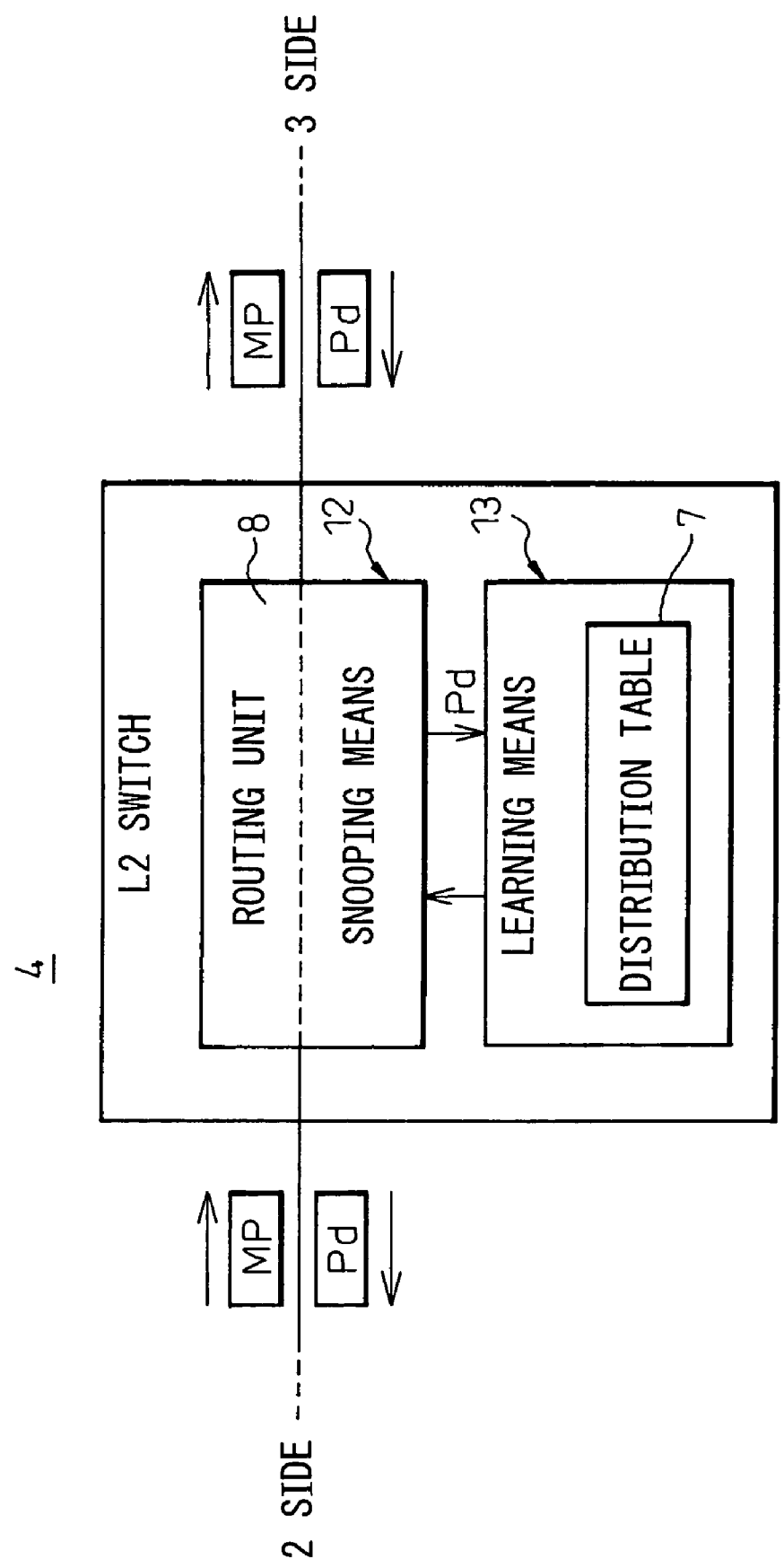
FIG. 5 is a view of the basic configuration of an L2 switch shown in FIGS. 1 and 2.

FIG. 5 is a view of the basic configuration of an L2 switch shown in FIGS. 1 and 2.

In the figure, the L2 switch 4 is a switch which relays multicast packets MP transmitted from the multicast transmitting terminal (source) 2 and distribute them to the multicast receiving terminals 3 and, as illustrated, include a snooping means 12 and a learning means 13.

This snooping means 12 teaches the L2 switch 4 that there is a multicast receiving terminal 3 requesting distribution of the multicast packets MP under it by monitoring for a discrimination packet Pd transmitted from a multicast receiving terminal. Further, the learning means 13 learns of the existence of a multicast receiving terminal based on the discrimination packet Pd extracted by the snooping means 12.

Note that these means 12 and 13 form parts of the receiving terminal discrimination mechanism 10 shown in FIGS. 1 and 2.

The learning means 13 further includes an existing distribution table 7.

The distribution table 7 learns the above-mentioned IP source address (SA) and MAC source address (SA) by the discrimination packet Pd, then the multicast packets MP transmitted from the multicast transmitting terminal 2 are distributed in accordance with the distribution table 7 by the existing routing unit 8.

Next, let us look at the L3 switch. This L3 switch is used in the type II network of FIG. 2 and is not present in the type I network of FIG. 1.

Figure 6:
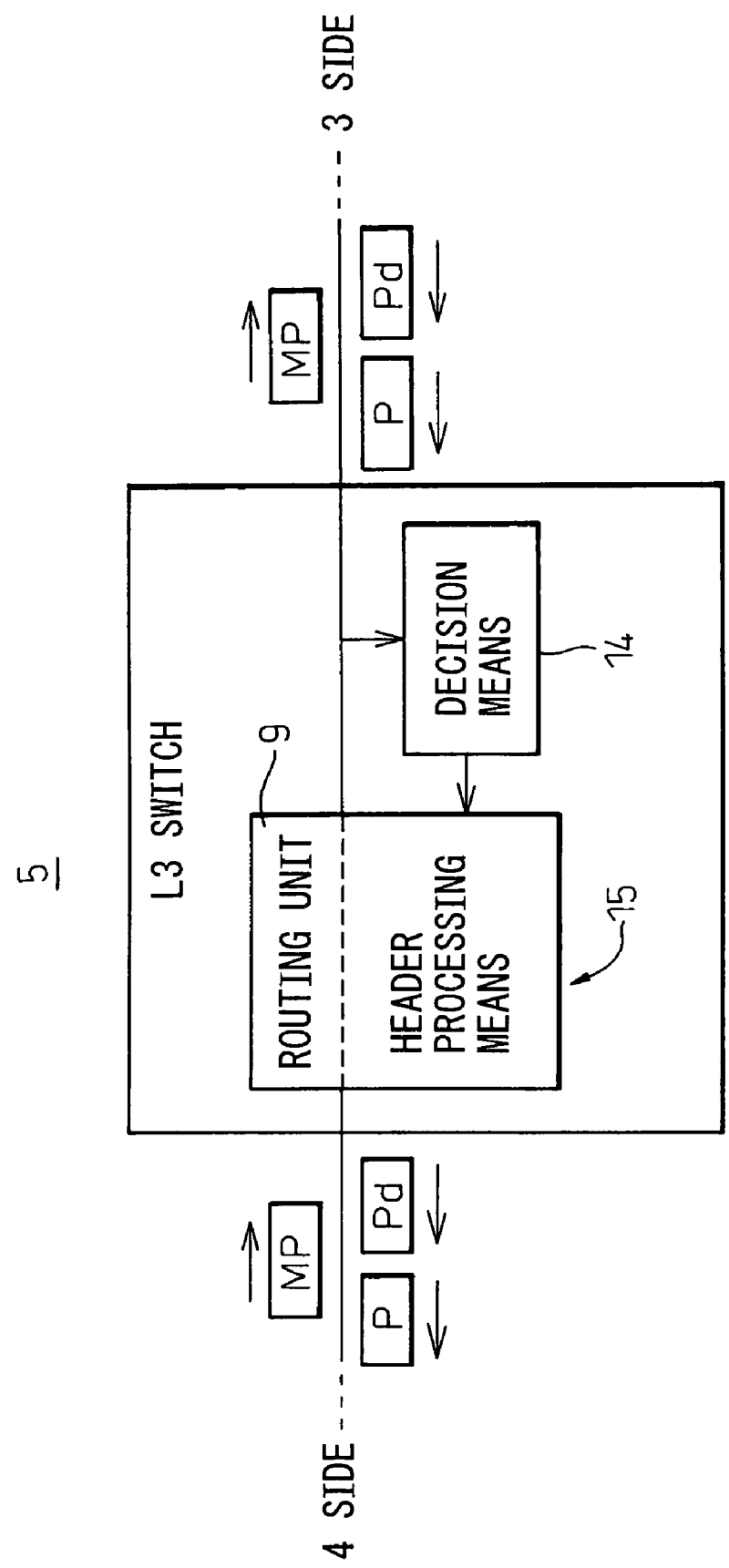
FIG. 6 is a view of the basic configuration of an L3 switch shown in FIGS. 1 and 2.

FIG. 6 is a view of the basic configuration of an L3 switch shown in FIG. 2.

In this figure, the L3 switch 5 is a switch which further relays multicast packets MP transmitted from the multicast transmitting terminal (source) 2 through at least an L2 switch 4 and distributes them to the multicast receiving terminals (receivers) 3 and which transmits to the L2 switch side a discrimination packet Pd for teaching the L2 switch 4 of the existence of a multicast receiving terminal requesting distribution of the multicast packets MP under it. The L3 switch 5, as illustrated, includes a decision means 14 and a header processing means 15.

The decision means 14 decides if a received packet is a discrimination packet Pd or a general packet P other than a discrimination packet Pd. On the other hand, the header processing means 15 is a means for processing a MAC header of a received packet. It performs different processing in accordance with the results of decision of the decision means 14.

The header processing means 15 does not process the source address (SA) of the MAC header when the decision means 14 decides that a received packet is a discrimination packet Pd, while it performs general rewriting processing on the MAC header and then transfers this by an existing routing unit 9 to a predetermined route when the decision means 14 decides that a received packet is a general packet P.

Here, the decision means 14 can decide if the IP header and MAC header of a received packet are those of a discrimination packet Pd or a general packet P according to whether they are multicast format addresses or unicast format addresses.

Note that these means 14 and 15 also form parts of the receiving terminal discrimination mechanism 10 shown in FIG. 2.

Figure 7:
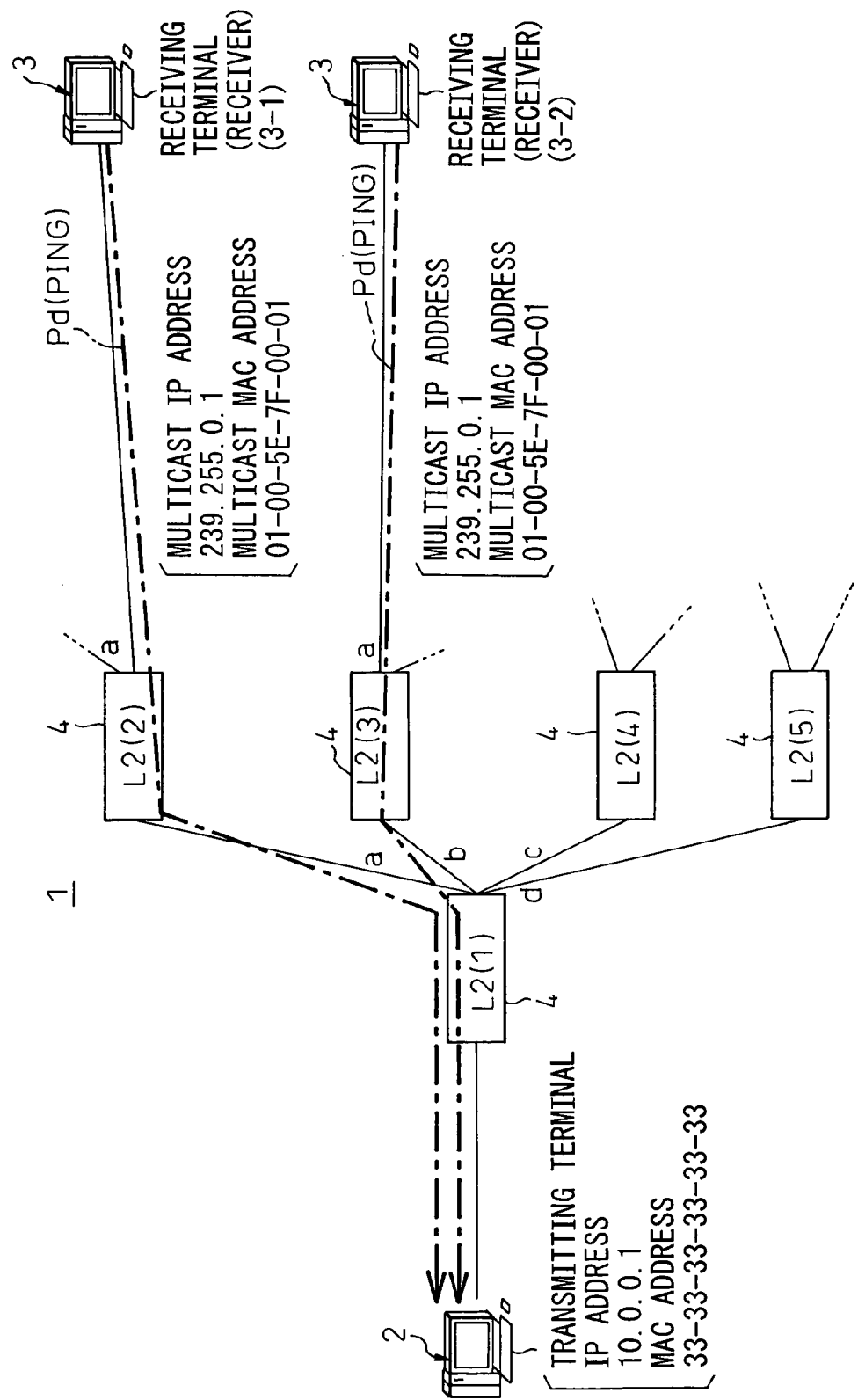
FIG. 7 is a view for explaining the operation under a type I network shown in FIG. 1.
Figure 8:
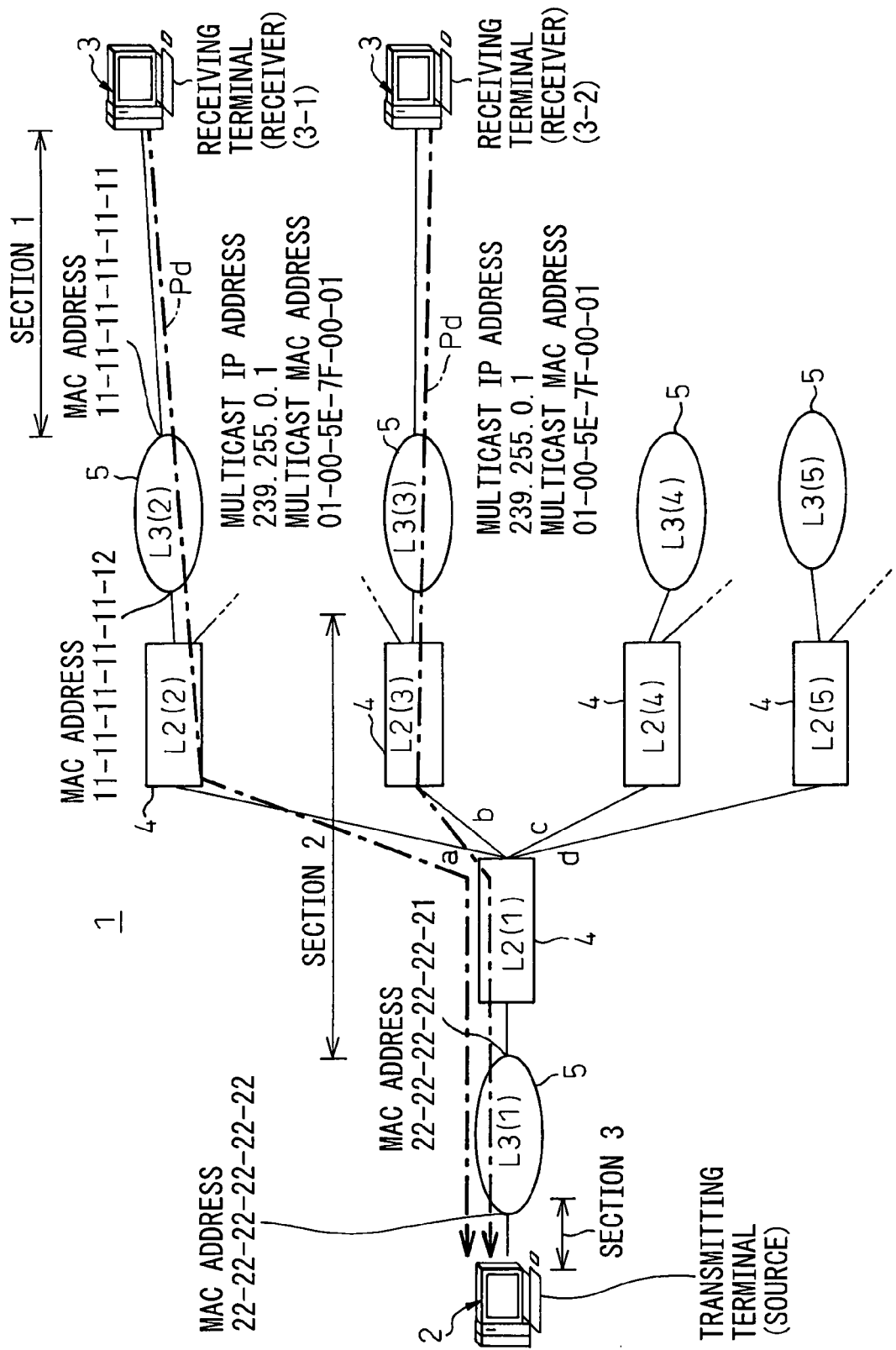
FIG. 8 is a view for explaining the operation under a type II network shown in FIG. 2.

FIG. 7 is a view for explaining the operation under the type I network shown in FIG. 1, while FIG. 8 is a view for explaining the operation under the type II network shown in FIG. 2.

First, referring to FIG. 7, the multicast receiving terminals (receivers) 3-1 and 3-2 are assumed to belong to the same multicast group. Therefore, they have the same multicast IP address, in the illustrated example, (239.255.0.1). In this case, as the multicast MAC address, predetermined logical processing is performed on the (239.255.0.1) in accordance with the established standards and (01-00-5E-7F-00-01) is automatically generated as a result. This MAC address is also shared by the multicast receiving terminals 3-1 and 3-2 belonging to the same multicast group. These addresses are described in FIG. 7.

These addresses are buried in the discrimination packet Pd and transmitted from the multicast receiving terminals 3-1 and 3-2.

Figure 9:
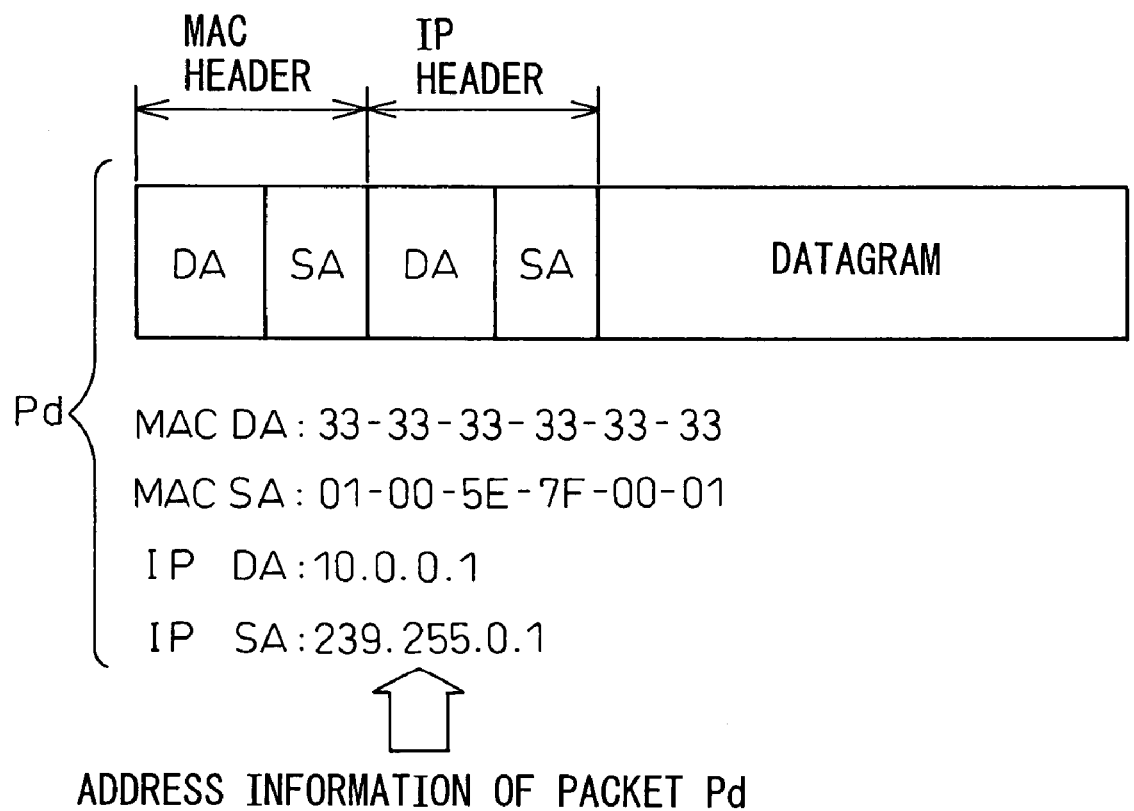
FIG. 9 is view of a specific example of address information buried in the discrimination packet Pd shown in FIG. 7.

FIG. 9 is a view of a specific example of the address information buried in the discrimination packet Pd shown in FIG. 7.

This packet Pd is shown in FIG. 7 as Pd (PING). That is, this shows that the packet Pd may be a packet of substantially the same format as a known PING (Packet InterNet Groper) message.

However, PING differs greatly from Pd in the method of setting the address. With an ordinary PING, the IP source address (SA) is set for example to IP SA: 10.0.0.2 and MAC SA: 11-11-11-11-11-11. However, for Pd, as shown in FIG. 9, it is specially set to IP SA: 239.255.0.1 (not 10.0.0.2 like with the PING IP SA) and MAC SA: 01-00-5E-7F-00-01 (not 11-11-. . . 11 like with PING MAC SA). Note that MAC DA and IP DA in FIG. 9 are the MAC and IP addresses of the multicast transmitting terminal (source) 2 shown at the left end of FIG. 7.

The point is that, as explained above, the discrimination packet Pd includes an IP header and MAC header. The IP SA address and MAC SA address are an IP address and MAC address of the multicast group to which the multicast receiving terminal (receiver) belongs. Due to this, the L2 switch 4 receiving a discrimination packet Pd recognizes the source address (SA) expressed as the multicast address and executes the above-mentioned "learning" process.

Returning to FIG. 7, the receiving terminals 3-1 and 3-2 transmit by unicast discrimination packets Pd of for example a PING message format preferably periodically toward the L2 switch 4 side to the transmitting terminal 2.

The L2 switches (4-1 to 4-5) perform "learning" operations similar to the usual "learning bridge". The learning means 13 (FIG. 5) in the L2 switch 4 "learns" at the receiving ports even when a MAC SA address is a multicast address. This is due to the special address setting explained in FIG. 9. The "learning" receiving ports are shown by a-a for the receiving terminal 3-1 in FIG. 7 and are shown by a-b for the receiving terminal 3-2. This situation is shown in the next figure.

Figure 10:
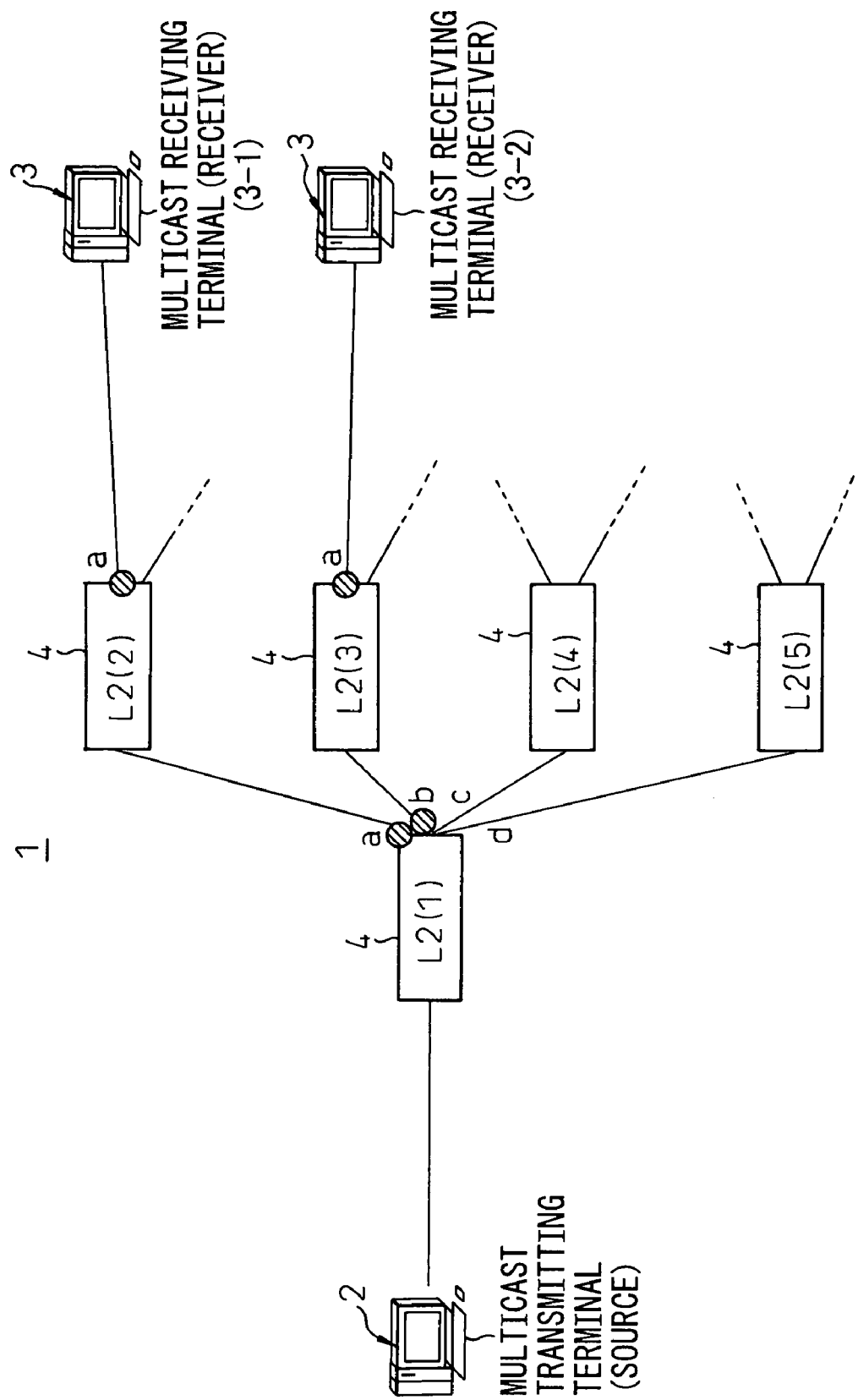
FIG. 10 is a view illustrating the state of the L2 switch learning in FIG. 7.

FIG. 10 is a view schematically illustrating the state of the L2 switch learning in FIG. 7.

Referring to FIGS. 10 and 7, the MAC SA (01-00-5E-7F-00-01) of a discrimination packet Pd transmitted from the multicast receiving terminal 3-1 to the multicast transmitting terminal 2 by unicast is learned at the port "a" of the L2 switch 4-2 and the port "a" of the L2 switch 4-1.

Similarly, the MAC SA (01-00-5E-7F-00-01) of the discrimination packet Pd transmitted from the multicast receiving terminal 3-2 to the multicast transmitting terminal 2 by unicast is learned at the port "a" of the L2 switch 4-3 and the port "b" of the L2 switch 4-1.

This state of learning is shown by the hatched "o" marks in FIG. 10. The port "a" and port "b" shown by the hatched "o" marks learn the MAC address (01-00-5E-7F-00-01). That is, the address is registered in the distribution table 7 (FIG. 5).

After the learning by the L2 switch 4, the multicast packets MP from the multicast transmitting terminal (source) 2 travel back over only the learned ports and are distributed to only the multicast receiving terminals (receivers) 3 (3-1 and 3-2). That is, the multicast packets MP are not routed to the ports not learned in FIG. 10 ("c" and "d" of FIG. 10). This state is illustrated next.

FIG. 11 are views of the state of routing of the multicast packets MP after learning at the L2 switch 4.

As shown in the figure, the multicast packets MP from the multicast transmitting terminal 2 travel back over the learned ports "a" and "b" and are routed to only the receiving terminals 3-1 and 3-2 of the multicast, group. Therefore, the multicast packets MP are never routed uselessly to the port "c" and port "d" side.

The figure will be explained in further detail next.

When the multicast transmitting terminal 2 transmits multicast packets MP to the multicast receiving terminals 3-1 and 3-2, the IP DA (destination address) of the transmitted packets becomes 239.255.0.1 and the MAC DA becomes 01-00-5E-7F-00-01 (see top right in FIG. 7). Here, the L2 switches 4-1 to 4-5 perform "learning" operations similar to the above-mentioned usual "learning bridge".

The multicast packets MP transmitted from the multicast transmitting terminal 2 reach the L2 switch 4-1. The L2 switch 4-1 operates as a "learning bridge", so the multicast packets MP are distributed only to the port "a" and port "b" at which the MAC address (01-00-5E-7F-00-01) is learned. In the same way for the other L2 switches 4-2 and 4-3 as well, the packets MP are distributed only to the ports "a" at which the MAC address (01-00-5E-7F-00-01) is learned. In the final analysis, the packets MP are not distributed to the L2 switches 4-4 and 4-5, whereby efficient multicast communication is realized.

Such efficient multicast communication can be realized because the multicast receiving terminals (receivers) 3 perform operations distinctive to the present invention explained in FIG. 7. Further, this distinctive operation is in practice preferably performed simultaneously with an IGMP JOIN operation explained in FIG. 16. An example of this distinctive operation will be explained next by a flow chart.

FIG. 12 is a flow chart showing an example of the operation of a multicast receiving terminal 3. In the figure, at step S11, the application for receiving multicast packets MP from the multicast transmitting terminal (source) 2 is started up.

At step S12, the IGMP JOIN packet is transmitted from an IGMP JOIN transmitting unit 6 (FIG. 3).

At step S13, a discrimination packet Pd configuring the IP source address (SA) and MAC source address (SA) by an IP address and MAC address of the multicast group for an IGMP JOIN operation is transmitted like for example a PING message.

Note that steps S12 and S13 may be in the illustrated order or may be in the reverse order.

Above, the explanation was made of a type I network (FIG. 7), so the type II network shown in FIG. 8 will be explained next. FIG. 8 differs from FIG. 7 in the point that the L3 switch 5-1 and L3 switches 5-2 to 5-5 have the L2 switches 4-1 to 4-5 interposed between them. Except for this point of difference, the explanation of FIG. 7 can be applied as it is to FIG. 8 as well.

Figure 13A:
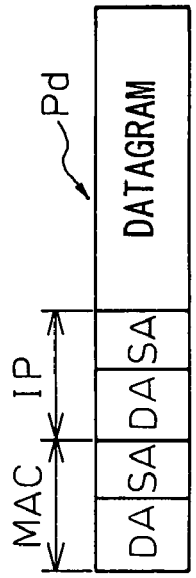
FIGS. 13(*a*) and 13(*b*) are views of addresses in sections 1 to 3 of FIG. 8, wherein FIG. 13(*a*) shows the transition in the case of no means 14 and 15 of FIGS. 6 and 13(*b*) shows the transition of an address in the case of existence of these means.

Looking at the above point of difference, that is, for example, the receiving terminal (receiver) 3-1, due to the L3 switch 5-2, the multicast MAC address 01-00-5E-7F-00-01 does not reach the L2 switch 4-2 as it is and ends up becoming meaningless even if "learned" at the L2 switch 4-2. This is due to the fact that the L3 switches perform processing for rewriting MAC addresses when transferring packets. This will be clarified in FIG. 13(a) while referring to FIG. 8, but before that the MAC addresses not shown in FIG. 7, but newly added at FIG. 8 will be explained.

As shown in FIG. 8, regarding the MAC address of the L3 switch 5-1, the MAC address at the side connected to the multicast transmitting terminal (source) 2 is made "22-22-22-22-22-22", while the MAC address at the side connected to the L2 switch 4-1 is made "22-22-22-22-22-21". Further, regarding the MAC address of the L3 switch 5-2, the MAC address at the side connected to the L2 switch 4-2 is made "11-11-1-11-11-12", while the MAC address at the side connected to the multicast receiving terminal 3-1 is made "11-11-11-11-11-11".

See FIGS. 13(*a*) and 13(*b*) with reference to an example of setting the MAC address in this way.

FIGS. 13(*a*) and 13(*b*) are views of the transition of an address in the sections 1 to 3 of FIG. 8 in the case of no means 14 and 15 of FIG. 6 (FIG. 13(*a*)) and in the case of existence of such means (FIG. 13(*b*)).

If using ordinary L3 switches as they are for the L3 switches 5-2 and 5-1 of FIG. 8, the address information of the discrimination packet Pd changes as shown in FIG. 13(*a*) while proceeding from the section 1 to section 2 and section 3. In particular, taking note of the MAC source address (SA), it changes from "01-00-5E-7F-00-01" to "11-11-11-11-11-12" to "22-22-22-22-22-22".

This being the case, the ports of the L2 switch 4-2 and the ports of the L2 switch 4-1 learn different MAC SA's. Therefore, the multicast packets MP from the multicast transmitting terminal (source) 2 cannot be routed right up to the target multicast receiving terminal (receiver) 3-1.

Therefore, the decision means 14 and the header processing means 15 shown in FIG. 6 explained above are formed in the L3 switches.

Figure 13B:
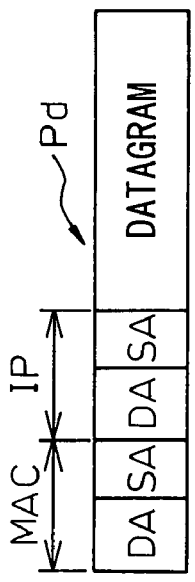

This being the case, the address information of the discrimination packet Pd changes as shown in FIG. 13B when proceeding from the section 1 to section 2 and to section 3. In particular, taking note of the MAC source address (SA), the same "01-00-5E-7F-00-01" is maintained in each of the sections. Therefore, the L2 switch 4-2 also learns the same MAC SA together with the L2 switch 4-1, and the multicast packets MP from the multicast transmitting terminal 2 can be routed without error up to the target multicasting receiving terminal 3-1.

Therefore, the present invention can be applied not only to the case of a type I network (FIG. 7), but also the type II network (FIG. 8). This is made possible by the L3 switch 5 shown in FIG. 6. Here, an example of the operation of this L3 switch 5 will be explained by a flow chart.

Figure 14:
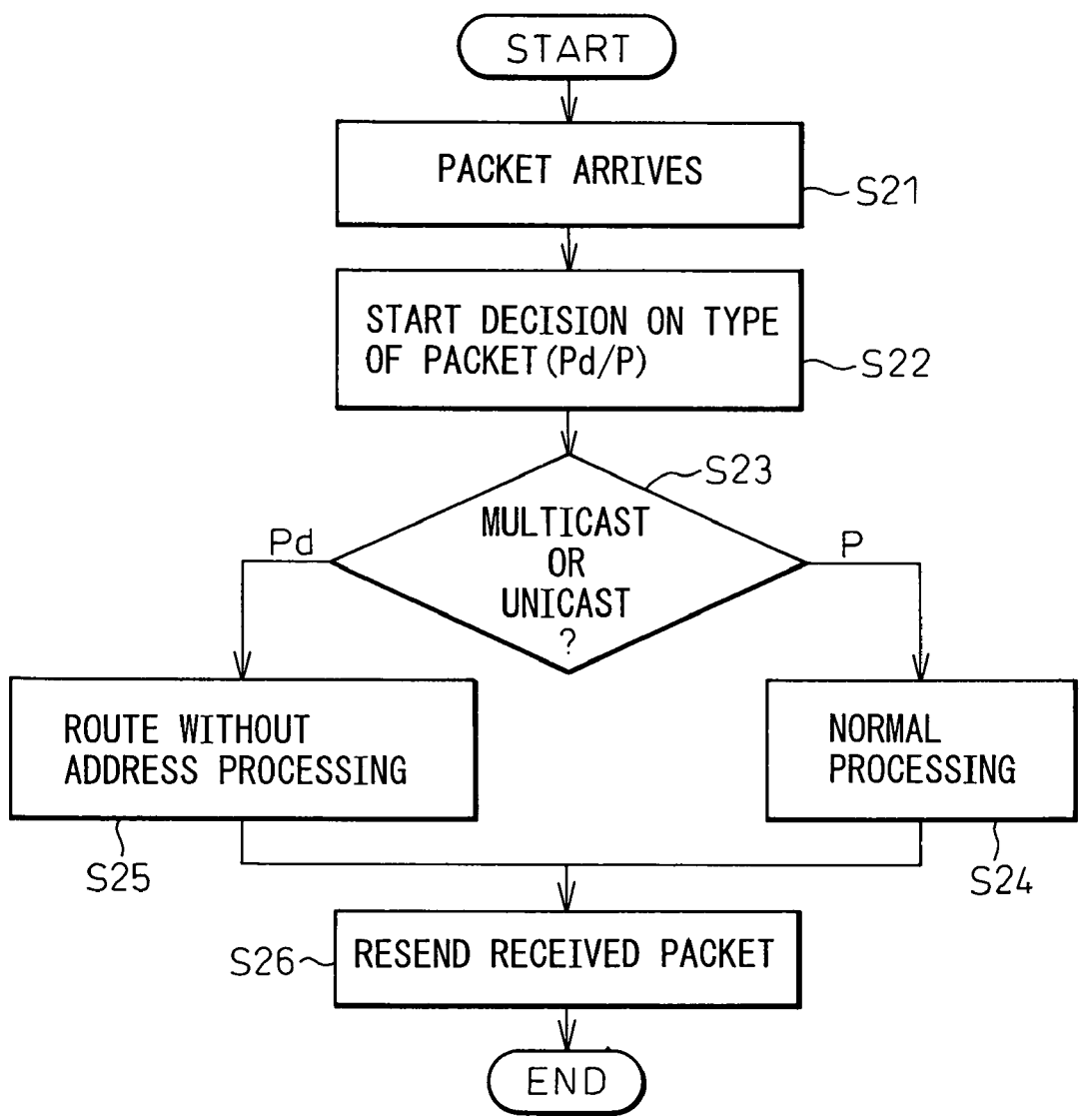
FIG. 14 is flow chart of an example of operation of an L3 switch 5.

FIG. 14 is a flow chart of an example of operation of the L3 switch 5. In the figure, at step S21, a packet directed to a multicast receiving terminal 2 arrives.

At step S22, whether the arriving packet is a discrimination packet Pd or a general packet P is decided by the decision means 14 fetching address information of the received packet.

At step S23, the decision means 14 decides if the address information is a multicast address format or a unicast address format.

If the unicast address format at step S23, at step S24, the received packet is decided to be a general packet and is normally processed. That is, the MAC address is rewritten (reattached) and the packet P is routed to the destination address (DA) by the routing unit 9.

If the multicast address format at step S23 (by established standard, "01-00-5E", "239.255", etc. are multicast address formats), at step S25, the received packet is decided to be a discrimination packet Pd. At this time, the packet P is routed to the destination address by the routing unit 9 as it is without being processed to rewrite the address.

At step S26, both the packet Pd and the packet P are resent to the destination address (DA).

Summarizing the effects of the invention, as explained above, according to the present invention, even in a network including L2 switches which would normally end up flooding the network with multicast packets, it is possible to selectively distribute multicast packets to only designated multicast receiving terminals (receivers). Due to this, it is possible to suppress an increase in unnecessary traffic accompanied with flooding.

Further, it is possible to handle even telecommunication services of broadband Ethernets and other networks constructed by L2 switches and expected to spread in the future.

While the invention has been described with reference to specific embodiments chosen for purpose of illustration, it should be apparent that numerous modifications could be made thereto by those skilled in the art without departing from the basic concept and scope of the invention.

What is claimed is:

1. A communication method in a multicast communication network, including at least one Layer-2 switch interposed between two Layer-3 switches, for distributing multicast packets from a multicast transmitting terminal (source) through at least the Layer-2 switch to a plurality of multicast receiving terminals (receivers), comprising:

forming a receiving terminal discrimination mechanism for discriminating multicast receiving terminals for receiving distribution of said multicast packets by using a discrimination packet, to be transmitted from said multicast receiving terminal to said multicast transmitting terminal when sending an IGMP-JOIN packet, for teaching said Layer-2 switch of an existence of the multicast receiving terminal requesting distribution of said multicast packets under the Layer-2 switch, the discrimination packet including an IP header and MAC header and wherein an IP source address and MAC source address are an IP address and MAC address of a multicast group to which said multicast receiving terminal belongs; and distributing multicast packets selectively by said receiving terminal discrimination mechanism only to multicast receiving terminals requesting distribution of said multicast packets when there are multicast receiving terminals relating to such requests under said Layer-2 switches, wherein each of said Layer-3 switches relays said multicast packets transmitted from said multicast transmitting terminal (source) through the Layer-2 switch and distributes them to said multicast receiving terminals requesting distribution of said multicast packets and transmits said discrimination packet, where each of the Layer-3 switches comprises a decision function unit for deciding if a received packet is the discrimination packet or a general packet other than the discrimination packet and a header processing function unit for processing the MAC header of said received packet and performing different processing in accordance with results of decision of said decision function unit.

2. The communication method as set forth in claim 1, wherein said header processing function unit does not process the source address of said MAC header when said decision function unit decides that said received packet is the discrimination packet and performs general rewriting processing on said MAC header when it decides that said received packet is the general packet.

3. The communication method as set forth in claim 1, wherein said decision function unit decides if said received packet is the discrimination packet or the general packet in accordance with whether said IP header and MAC header of the received packet are a multicast type address or a unicast type address.

4. A multicast receiving terminal (receiver) for receiving distribution of multicast packets from a multicast transmitting terminal through at least one Layer-2 switch, interposed between two Layer-3 switches, provided with a discrimination packet transmitting function unit for generating a discrimination packet for teaching said Layer-2 switch of an existence of the multicast receiving terminal requesting distribution of said multicast packets under the Layer-2 switch and transmitting the discrimination packet to said multicast transmitting terminal when sending an IGMP-JOIN packet, the discrimination packet including an IP header and MAC header and wherein the IP source address and MAC source address are an IP address and MAC address of a multicast group to which said multicast receiving terminal belongs, wherein each of said Layer-3 switches relays said multicast packets transmitted from said multicast transmitting terminal (source) through the Layer-2 switch and distributes them to said multicast receiving terminal and transmits said discrimination packet, where each of the Layer-3 switches comprises a decision function unit for deciding if a received packet is the discrimination packet or a general packet other than the discrimination packet and a header processing function unit for processing the MAC header of said received packet and performing different processing in accordance with results of decision of said decision function unit.

5. The multicast receiving terminal (receiver) as set forth in claim 4, wherein said header processing function unit does not process the source address of said MAC header when said decision function unit decides that said received packet is the discrimination packet and performs general rewriting processing on said MC header when it decides that said received packet is the general packet.

6. The multicast receiving terminal (receiver) as set forth in claim 4, wherein said decision function unit decides if said received packet is the discrimination packet or the general packet in accordance with whether said IP header and MAC header of the received packet are a multicast type address or a unicast type address.

7. The multicast receiving terminal (receiver) as set forth in claim 4, wherein said discrimination packet is transmitted periodically by unicast.

8. A Layer-2 switch, interposed between two Layer-3 switches, for relaying multicast packets transmitted from a multicast transmitting terminal (source) and distributing them to a multicast receiving terminal (receiver), comprising;

a snooping function unit for monitoring for a discrimination packet transmitted from said multicast receiving terminal to said multicast transmitting terminal when sending an IGMP-JOIN packet so as to teach said Layer-2 switch that there is a multicast receiving terminal requesting distribution of said multicast packets existing under the Layer-2 switch, the discrimination packet including an IP header and MAC header and wherein an IP source address and MAC source address are an IP address and MAC address of a multicast group to which said multicast receiving terminal belongs; and a learning function unit for learning an existence of said multicast receiving terminal based on said discrimination packet extracted by said snooping function unit, wherein each of said Layer-3 switches relays said multicast packets transmitted from said multicast transmitting terminal (source) through the Layer-2 switch and distributes them to said multicast receiving terminal and transmits said discrimination packet, where each of the Layer-3 switches comprises a decision function unit for deciding if a received packet is the discrimination packet or a general packet other than the discrimination packet and a header processing function unit for processing the MAC header of said received packet and performing different processing in accordance with results of decision of said decision function unit.

9. The Layer-2 switch as set forth in claim 8, wherein said learning function unit includes a distribution table, and the distribution table learns said IP source address and MAC source address, then multicast packets transmitted from said multicast transmitting terminal (source) are distributed in accordance with said distribution table.

* * * * *

UNITED STATES PATENT AND TRADEMARK OFFICE
CERTIFICATE OF CORRECTION

PATENT NO.       : 7,639,683 B2                                    Page 1 of 1
APPLICATION NO.  : 10/796223
DATED            : December 29, 2009
INVENTOR(S)      : Uchiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Ninth Day of November, 2010

David J. Kappos
*Director of the United States Patent and Trademark Office*